United States Patent [19]

Sprotbery

[11] Patent Number: 5,465,174
[45] Date of Patent: Nov. 7, 1995

[54] SINGLE LIGHT VALVE FULL-COLOR PROJECTOR DISPLAY

[76] Inventor: Donald E. Sprotbery, 6033 Butterfield La., Anaheim Hills, Calif. 92807

[21] Appl. No.: 216,773

[22] Filed: Mar. 23, 1994

Related U.S. Application Data

[63] Continuation of Ser. No. 77,131, May 27, 1993, abandoned, which is a continuation of Ser. No. 712,236, Jun. 7, 1991, abandoned.

[51] Int. Cl.$^6$ .............................. G02F 1/133; H04N 5/74
[52] U.S. Cl. .............................. 359/40; 359/72; 359/68; 348/761; 348/769; 353/31
[58] Field of Search .............................. 359/40, 41, 45, 359/68, 72, 48, 305; 358/60–63, 231, 235, 236; 353/31, 33, 122; 348/761, 766, 769

[56] References Cited

U.S. PATENT DOCUMENTS

| | | | |
|---|---|---|---|
| 4,035,060 | 7/1977 | Tsunoda et al. | 359/85 |
| 4,150,396 | 4/1979 | Hareng et al. | 359/45 |
| 4,389,096 | 6/1983 | Hori et al. | 359/72 |
| 4,538,884 | 9/1985 | Masaki | 359/72 |
| 4,560,241 | 12/1985 | Stolov et al. | 359/68 |
| 4,561,727 | 12/1985 | Heeks et al. | 359/45 |
| 4,611,245 | 9/1986 | Trias | 358/236 |
| 4,613,207 | 9/1986 | Fergason | 359/41 |
| 4,836,649 | 6/1989 | Ledebuhr et al. | 359/41 |
| 4,843,381 | 6/1989 | Baron | 359/68 |
| 4,855,724 | 8/1989 | Yang | 359/68 |
| 4,978,202 | 12/1990 | Yang | 359/63 |
| 5,040,877 | 8/1991 | Blinc et al. | 359/53 |

FOREIGN PATENT DOCUMENTS 63-231479  9/1988  Japan.

OTHER PUBLICATIONS

Hong et al "Application of the Liquid Crystal Light Valve to a Large Screen Graphics Display" Electronic Displays–IEEE Press–1984–pp. 106–107.
Jarret et al "A Liquid–Crystal Light Valve with RGB Color Stripes" SID Digest–1986–pp. 383–384.

*Primary Examiner*—William L. Sikes
*Assistant Examiner*—Tai V. Duong

[57] ABSTRACT

A single light valve full-color projector 10 operative to display an image on a screen 12 in response to first and second video signals. The inventive projector 10 includes a laser 22 for providing a beam of coherent light. A scanning control circuit 20 coupled to the laser 22 varies the intensity of the beam on the basis of information inherent in the first and second video signals. The inventive projector 10 further includes a liquid crystal light valve 26 which modulates light illuminating an output layer 44 thereof in accordance with an internally generated voltage pattern produced by incidence of the modulated beam on an input layer 40 thereof. A raster scanner 24 is operative to deflect the beam to a first set of areas on the input layer 40 in response to the first video signal and to deflect the beam to a second set of areas on the input layer in response to the second video signal. The projector display 10 of the present invention further includes a polarizing beam splitter 46 positioned in an optical path between the output layer 44 and an external light source 42 for polarizing and directing the light from the external source 42 onto the light valve output layer 44 and for relaying modulated light reflected by the output layer 44 to an image plane P. A striped filter arrangement 18 having first and second sets of filter elements in optical alignment with the first and second sets of areas of the input layer 40 transmits radiant energy in first and second wavelength bands, respectively, to the display screen 12.

16 Claims, 4 Drawing Sheets

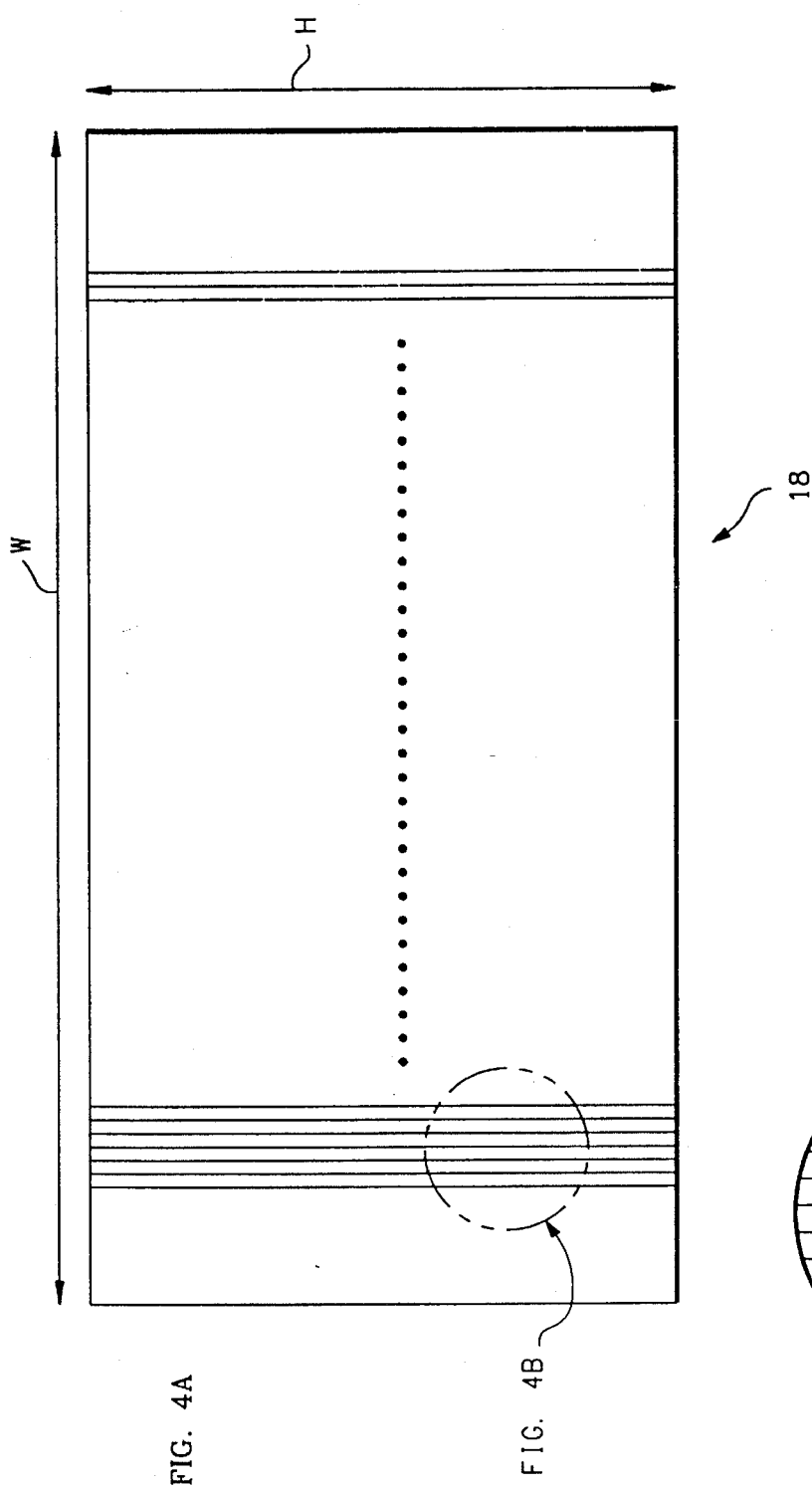
FIG. 4A
FIG. 4B
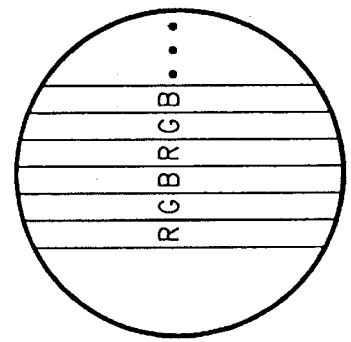
FIG. 4B

SINGLE LIGHT VALVE FULL-COLOR PROJECTOR DISPLAY

This is a continuation of U.S. patent application Ser. No. 08/077,131, filed May 27, 1993, now abandoned, which is a continuation of prior application Ser. No. 07/712,236, filed Jun. 7, 1991, now abandoned.

BACKGROUND OF THE INVENTION

1. Field of the Invention

This invention relates to image projection systems. More specifically, this invention relates to liquid crystal light valve image projection systems.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Much progress in the state of the art of high quality large screen projectors can be attributed to the development of the liquid crystal light valve. The reflective mode liquid crystal light valve is a thin film, multilayer structure comprising a liquid crystal layer, a dielectric mirror, a light blocking layer, and a photoresponsive layer. The multilayer structure is sandwiched between two transparent electrodes. A polarized projection beam is directed through the liquid crystal layer to the dielectric mirror. An input image of low intensity light, such as that generated by a cathode ray tube, is applied to the photoresponsive layer. Application of this low intensity light to the photoresponsive layer induces a spatial variation in the voltage drop across the photoresponsive layer in the pattern of the input image. The spatial variation in voltage drop across the photoresponsive layer is mirrored in reverse within the liquid crystal given the series relationship existing between the two layers. Linearly polarized projection light passing through the liquid crystal layer and reflecting from the dielectric mirrors is polarization-modulated in accordance with the input image impressed on the photoconductor and mirrored in the liquid crystal layer. Accordingly, the light valve is operative to create a replica of an image focused onto the photoconductive layer which can be projected with magnification to produce a high brightness image on a viewing screen. U.S. Pat. No. 4,019,807 issued to D. D. Boswell et al discloses such a high-performance reflective mode liquid crystal light valve.

A graphics display projector using a liquid crystal light valve of the above type is described in an article entitled "Application of the Liquid Crystal Light Valve to a Large Screen Graphics Display", published in the 1979 *Society for Information Display* (SID), International Symposium, Digest of Technical Papers, May 1979, pp. 22– 23. More sophisticated liquid crystal light valve image projection systems are illustrated in the following patents: U.S. Patent Nos. 4,425,028, issued to R. J. Gagnon et al on Jan. 10, 1984; 4,544,237, issued to R. J. Gagnon on Oct. 1, 1985; 4,461,542 to R. J. Gagnon on Jul. 24, 1984; and 4,464,019, issued to R. J. Gagnon on Aug. 7, 1984.

In many conventional liquid crystal light valve image projection systems, three primary color images (red, green and blue) are displayed in optical registration on a viewing screen. The three primary color images are typically generated by three separate light valves, which are projected on the screen by three separate projection lenses. The projection lenses are arranged about an optical axis which passes through the composite image displayed on the screen. In such an arrangement of projection lenses it is necessary that the three primary color images converge in the plane occupied by the screen. In order to effect such convergence, complicated and expensive optical arrangements with accompanying electronics are typically required.

Moreover, in systems incorporating multiple light valves each is typically addressed by a separate laser beam. The addressing (writing) laser beams are amplitude modulated in response to a video signal corresponding to either a red, green or blue primary color image. A separate beam deflection network is used to scan each beam in the horizontal and vertical directions over the writing surface of the light valve. In this way the red, green and blue primary color images encoded in an input video signal are replicated in the three light valves.

Such multiple light valve displays allow for high resolution image projection, but are expensive to implement. As noted above, a separate liquid crystal light valve is required to engender each of the primary color images and a separate beam deflection network must necessarily be employed in association with each light valve. Accordingly, a full-color image display system utilizing only one light valve and a single associated beam deflection network would be significantly less costly than existing display systems. In addition, such a single light valve system could be configured to occupy substantially less volume than those incorporating three light valves.

Hence, a need in the art exists for a full-color image display system having only a single light valve.

SUMMARY OF THE INVENTION

The need in the art for a single light valve full-color image display system is addressed by the projector display of the present invention. The inventive single light valve projector is operative to display an image on a screen in response to first and second video signals. In a particular embodiment the inventive projector is disposed to display a full-color image in response to red, green and blue video signals. The projector display of the present invention includes a laser for providing a beam of coherent light. A scanning control circuit coupled to the laser varies the intensity of the beam on the basis of the color content of the video Signals. The inventive display further includes a liquid crystal light valve which modulates light illuminating an output layer thereof in accordance with an internally generated voltage pattern produced by incidence of the modulated beam on an input layer thereof. A raster scanner is operative to sequentially deflect the beam across the input layer. In particular, the scanning network causes the deflected beam to illuminate a first set of areas on the input layer in response to the first video signal and to illuminate a second set of areas on the input layer in response to the second video signal. The projector display of the present invention further includes a polarizing beam splitter positioned in an optical path between the output layer and an external light source for polarizing and directing the light from the external source onto the light valve output layer and for relaying modulated light reflected by the output layer to an image plane. A striped filter arrangement having first and second sets of filter elements in optical alignment with the first and second sets of areas of the input layer transmits radiant energy in first and second wavelength bands, respectively, to the display screen.

BRIEF DESCRIPTION OF THE DRAWINGS

FIGS. 4A and 4B are front views of the striped filter utilized in the single light valve full-color image projection system of the present invention

DETAILED DESCRIPTION OF THE INVENTION

Figure 1:
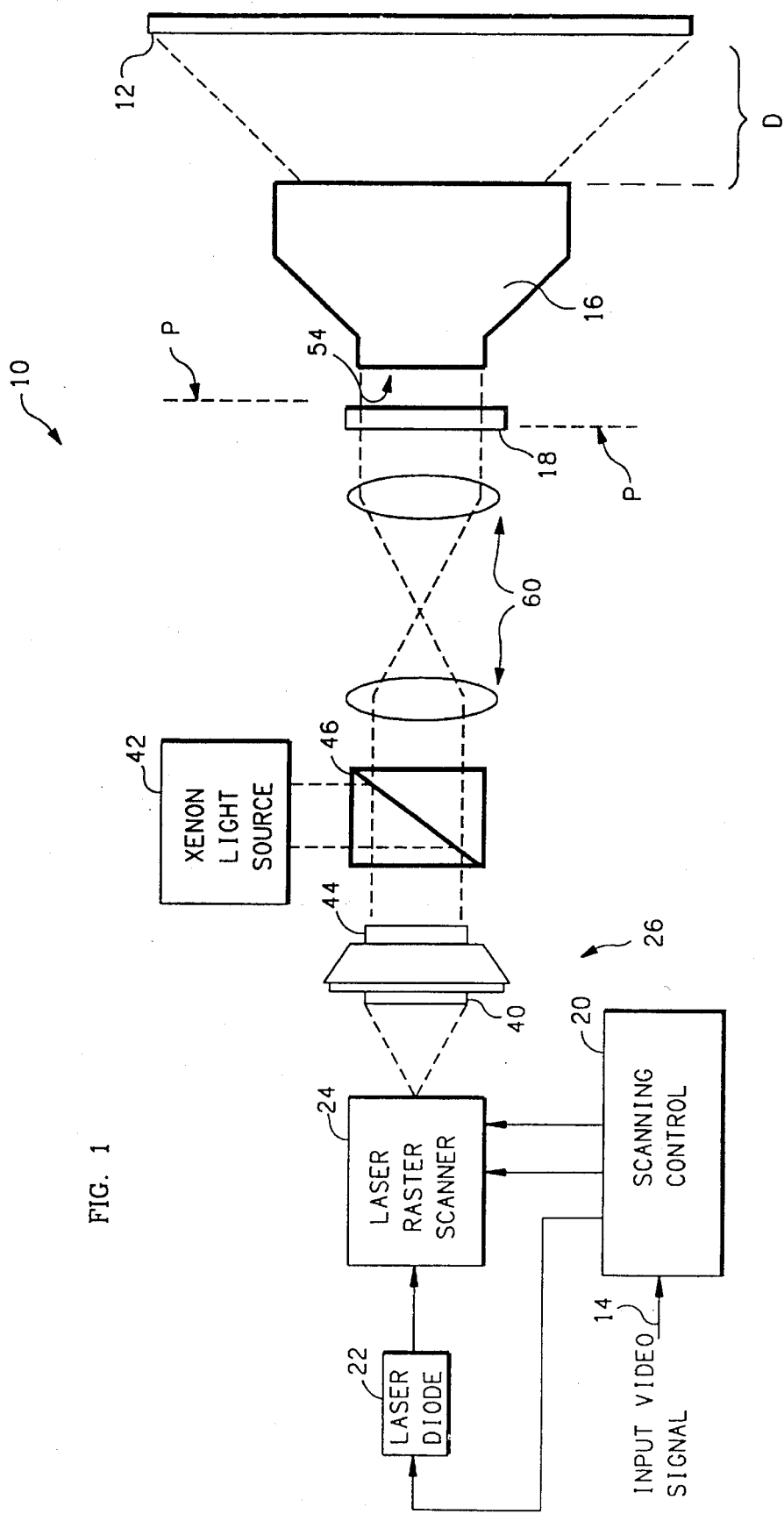
FIG. 1 is a block diagram of the single light valve full-color image projection system of the present invention.

FIG. 1 is a block diagram of the single light valve full-color image projection system 10 of the present invention. The system 10 includes a display screen 12 on which is projected a real-time image by a projection lens 16. As described more fully below, a striped filter 18 positioned proximate the projection lens 16 enables generation of a full-color image using a single light valve. The projected image is generated in response to an input video signal initially processed by a scanning control circuit 20. A laser diode 22 supplies a writing beam to a laser raster scanner 24. The raster scanner 24 scans a liquid crystal light valve 26 with the writing beam in order to record the input video information therein. The recorded video information is then transferred to the striped filter 18 via output illumination supplied by a xenon source 42.

Referring again to FIG. 1, the dimensions of the screen 12 may be varied from several feet on each edge to approximately the size of a wall, on which the screen 12 may be mounted. The distance D between the screen 12 and a projection lens 16 of the display 10 is adjusted such that the projected image fills the screen 12. Again, the color stripe filter 18 is positioned in an intermediate image plane of an optical relay to allow projection of a full-color image using only a single liquid crystal light valve. In contrast, conventional color light valve projectors generally require a separate light valve and appurtenant electronics for each primary color (i.e. red, green, blue) image.

The input video signal present on the line 14 may comprise either an NTSC (standard television) signal or an "RGB" (red, green, blue) video monitor signal. In either case, the input video information is fed to the scanning control circuit 20 which separates this video input into its constituent red, green and blue primary color image signals in a conventional manner. The scanning control circuit 20 samples each analog primary color image signal and electronically stores each of the three resulting digital signal representations. As discussed below, the digitized version of the analog video input stored in the scanning control circuit 20 is used to control both the intensity of a coherent beam generated by the laser 22 and the beam direction via the laser raster scanner 24.

The laser 22 generates an output beam at a predetermined wavelength. Although any of several wavelengths may be selected for the laser 22, the selected wavelength will preferably match the spectral response of the amorphous liquid crystal light valve 26 positioned in optical alignment With the laser raster scanner 24.

The amplitude of the beam produced by the laser 22 is modulated by varying the current supplied thereto in accord with the digital primary color image data stored in the scanning control circuit 20. In particular, digital data values corresponding to the instantaneous intensity of portions of the red, green and blue primary color images are alternately used to regulate the laser drive current.

Figure 2:
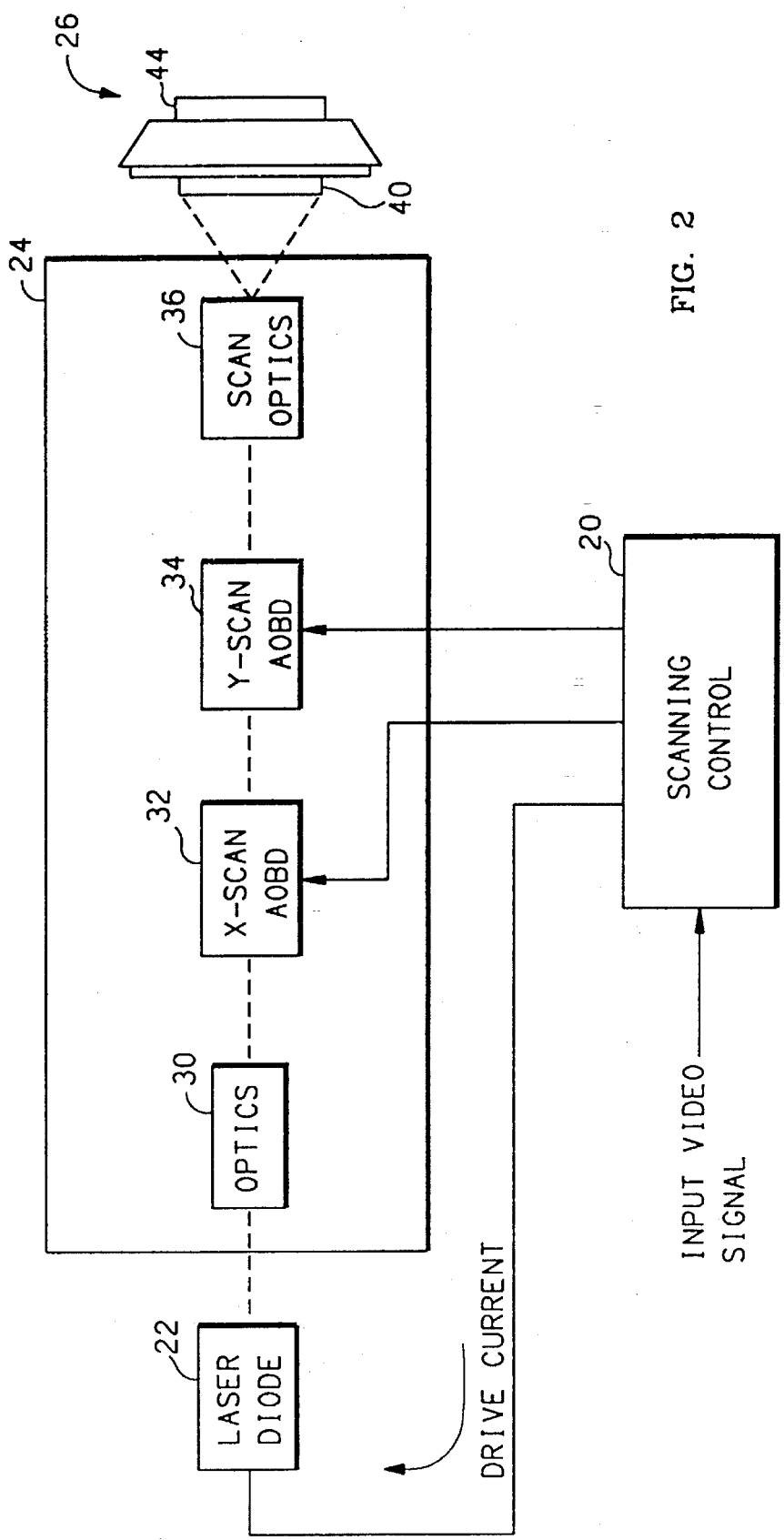
FIG. 2 is a block diagram of a laser raster scanner utilized in the single light valve full-color image projection system of the present invention.

FIG. 2 is a block diagram of the laser raster scanner 24 utilized in the single light valve full-color image projection system 10 of the present invention. As shown in FIG. 2, the laser raster scanner 24 includes beam shaping optics 30, an X-scan acousto-optic beam deflector 32, a Y-scan acousto-optic beam deflector 34 and scan optics 36. The beam shaping optics 30 includes a conventional arrangement of cylindrical lenses designed to narrow the output of the laser diode 22 to a beam size (e.g. 7.2 mm for a $TEO_2$ crystal) appropriate for the beam deflectors 32 and 34.

The beam deflectors 32 and 34 each include an electro-optic crystal for deflecting the laser beam passing therethrough to effectuate a desired scan pattern. As is well known, each of the beam deflectors 32, 34 typically includes a transducer for imparting an acoustic wave to an electro-optic crystal. The acoustic wavefront alters the index of refraction of the crystal, thereby inducing a change in the propagation direction of the beam. The scanning control circuit 20 is synchronized such that the beam deflectors 32, 34 direct the beam to the portion of the input image associated with the red, green or blue primary color image data instantaneously controlling the intensity of the laser 22.

Figure 3:
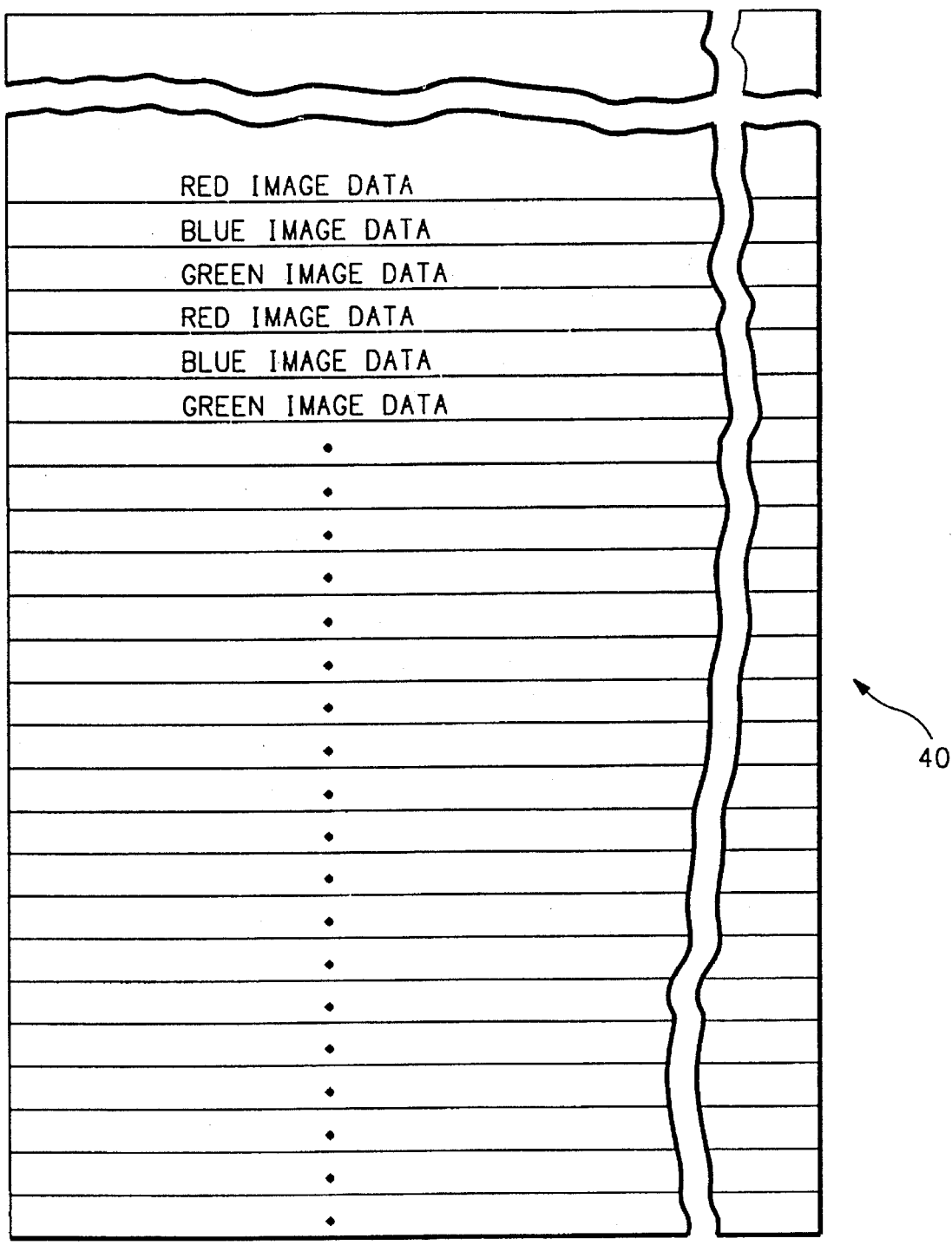
FIG. 3 illustrates a distribution of primary color image data written on an input layer of the single light valve full-color image projection system of the present invention.

The beam deflectors 32, 34 operate to scan the laser beam over an input photosensitive layer 40 of the light valve 26 in a manner which results in the distribution of primary color image information shown in FIG. 3.

FIG. 3 illustrates a distribution of primary color image data written on an input layer of the single light valve full-color image projection system of the present invention. Image intensity data corresponding to the red, green and blue primary color images is sequentially supplied to the laser 22 as the laser beam scans horizontal rows over the layer 40. The scan optics 36 include optical elements arranged to impart an elliptical cross-section to the laser beam prior to incidence of the beam on the input layer 40. The major axis of the ellipse corresponds to the height of each horizontal row written on the input layer 40. As a consequence, columns of primary color image information approximately equal in width to the elliptical minor axis are written on the photosensitive layer 40 as successive horizontal rows are scanned. This "writing" is effected as the photosensitive layer 40 detects the deflected laser beam and impresses a voltage pattern a nematic liquid crystal layer in response thereto. With an elliptical beam spot having major and minor axes of 27.78 and 9.26 microns and an input layer 40 having a width of 1.414 inches and a height of 1.125 inches, approximately 1024 horizontal rows are scanned and approximately 1280 columns of primary color image data may be created.

As disclosed below, the striped filter 18 includes an arrangement of interleaved color filter elements in a pattern substantially identical to, and in optical alignment with, the striped image data pattern written on the layer 40. For example, the vertically oriented rectangular portions of the layer 40 on which red color image information is written are in optical alignment via the light valve 26 with identically oriented rectangular red filter elements of the striped filter 18. Hence, with a single light valve 26 three distinct primary color images are generated.

The primary color images written in the light valve 26 are illuminated by a broadband Xenon light source 42. Collimated high intensity illumination from the light source 42 is made to impinge on an output layer 44 of the light valve 26 subsequent to being polarized and redirected by a polarizing prism 46. The polarizing prism may be realized from a McNeille biprism which linearly polarizes an incoherent beam such as that produced by the source 42. The output layer 44 is composed of a combination light blocking and dielectric mirror layer which isolates the writing beam from the high intensity beam emitted by the source 42. The dielectric mirror reflects the high intensity Xenon output light away from the light valve 26 while the blocking layer prevents leakage of the high intensity beam to the photosensitive input layer 40. As is well understood, image information (such as the striped pattern of primary color image data) written on the input layer 40 is replicated across a liquid crystal layer (not shown) adjacent the output layer 44. The liquid crystal layer then induces a change in the polarization of the plane-polarized high intensity light arriving from the source 42 by way of the prism 46. When reflected from the light valve 26, the polarization modulated high intensity beam passes back through the prism 46 to an optical relay 50.

In the illustrative embodiment of FIG. 1 the optical relay 50 operates at a 1:1 magnification in transferring the primary color images within the light valve 26 to an intermediate image plane P. In other embodiments an alternative magnification may be preferred to facilitate use of striped filters 18 having dimensions different from that of the input layer 40 of the light valve 26. In this way primary color images present in the light valve 26 are focused upon the striped filter 18 positioned in the image plane P.

FIGS. 4A and 4b show front views of the striped filter 18, which, in the illustrative embodiment, has a height H of 1.125 inches and a width W of 1.414 inches. The filter 18 includes an interleaved arrangement of red (R), green (G) and blue (B) color filters. Each of the red, green and blue color filters is optically aligned with an associated rectangular region (see FIG. 3) of the input layer 40 of the light valve 26. The red, green and blue filter elements of the striped filter 18 are operative to transmit the high intensity light reflected by the light valve 26 within the red, green and blue optical wavelength spectra, respectively. Light transmitted by the striped filter 18 is then projected on the screen 12 by the projection lens 16 to produce a full color image.

The striped filter 18 may be fabricated by coating a suitably transparent substrate such as glass with the plurality of filter stripes depicted in FIGS. 4A and 4B. Each filter stripe may be realized by conventionally depositing upon the substrate a dielectric layer of appropriate thickness to transmit the optical wavelength spectra (red, green, or blue) of interest. The glass substrate need only be sufficiently thick to adequately support the dielectric deposition. The filter 18 may be oriented such that either surface (coated or uncoated) of the filter 18 faces an input aperture 54 of the projection lens 16.

In an alternately preferred embodiment of the invention, the striped filter is positioned adjacent the output layer 44 of the light valve 26 rather than in the intermediate image plane P. The striped filter utilized in the alternative embodiment would be dimensioned and fabricated identically to the filter 18 depicted in FIGS. 4A and 4B. Again, the interleaved color filter elements of the striped filter would be optically aligned with the striped image data pattern written on the layer 40. The striped filter would preferably be mechanically coupled to the light valve 26 so as to face the output layer 44. The red, green and blue filter elements of the striped filter would again be operative to transmit the high intensity light reflected by the light valve 26 within the red, green and blue optical wavelength spectra, respectively. Light transmitted by the striped filter would then pass through the prism 46 and be relayed to the projection lens 16 to produce a full color image on the screen 12.

Thus the present invention has been described with reference to a particular embodiment in connection with a particular application. Those having ordinary skill in the art and access to the teachings of the present invention will recognize additional modifications and applications within the scope thereof. For example, the teachings of the present invention are not limited to the particular pattern or number of filter elements included within the striped filter. By altering the scan pattern of the laser beam on the input layer of the light valve it is possible to create patterns of image data other than an interleaved rectangular arrangement. Employment of an alternative scan pattern necessitates fabrication of an optical filter having an arrangement of filter elements which mirrors the image data written in the light valve. In addition, the present invention is not limited to the particular laser raster scanning or light valve illumination schemes described herein. Those skilled in the art may be aware of other methods of scanning a laser beam in response to stored samples of an input video signal.

It is therefore contemplated by the appended claims to cover any and all such modifications.

Accordingly,

What is claimed is:

1. A projection apparatus for displaying an image on screen in accordance with the first and second video signals comprising:

laser means for providing a beam of coherent light;

means for controlling the intensity of said coherent beam in response to said first and second video signals;

liquid crystal light valve means in optical alignment with said coherent beam for modulating light illuminating an output layer thereof in accordance with an internally generated voltage pattern produced in response to incidence of said coherent beam on an input layer thereof;

scanning means for deflecting the coherent beam to a first set of areas on said input layer in response to said first video signal and for deflecting said coherent beam to a second set of areas on said input layer in response to said second video signal;

means for illuminating said output layer with a light source;

polarizing beam splitter means positioned in an optical path between said illuminating light source and said output layer for polarizing and directing said illuminating light onto said output layer and for relaying modulating light reflected by said output layer to an image plane; and striped filter means disposed at said image plane between said beam splitter means and said screen having first and second sets of filter elements in optical alignment with said first and second sets of areas of said input layer for transmitting radiant energy in first and second wavelength bands, respectively, to said display screen wherein said radiant energy passes through said striped filter means only once.

2. The apparatus of claim 1 wherein each of said first areas is rectangular and wherein each of said second areas is rectangular.

3. The apparatus of claim 2 wherein each of said first and second rectangular areas extends across the entirety of said input layer, and wherein said first and second sets of rectangular areas are interleaved.

4. The projection apparatus of claim 3 wherein said striped filter means includes an optically transparent planar substrate.

5. The projection apparatus of claim 4 wherein each of said filter elements comprises a portion of said planar substrate coated with a dielectric layer.

6. The projection apparatus of claim 5 wherein each of said filter elements is rectangular.

7. The projection apparatus of claim 6 wherein said first and second filter elements are interleaved.

8. The projection apparatus of claim 7 wherein said rectangular interleaved filter elements are vertically oriented.

9. The projection apparatus of claim 1 wherein said beam splitter means includes a polarizing prism and a relay lens arrangement aligned therewith.

10. A projection apparatus for displaying a full-color image on a screen in accordance with red, green and blue video signals comprising:

laser means for providing a beam of coherent light;

means for controlling the intensity of said coherent beam in response to said red, green and blue video signals;

a liquid crystal light valve in optical alignment with said coherent beam for modulating light illuminating an output layer thereof in accordance with an internally generated voltage pattern produced in response to incident of said coherent beam on an input layer thereof;

scanning means for deflecting the coherent beam to a first set of areas on said input layer in response to said red video signal and for deflecting said coherent beam to a second et of areas on said input layer in response to said blue video signal an for deflecting said coherent beam to a third set of areas on said input layer in response to said green video signal;

means for illuminating said output layer with a light source;

polarizing beam splitter means positioned in an optical path between said illuminating light source and said output layer for polarizing and directing said illuminating light onto said output layer and for relaying modulated light reflected by said output layer to an image plane; and striped filter means disposed at said image plane, having red, blue and green filter elements in optical alignment with said first, second and third sets of areas of said input layer for transmitting radiant energy in red, green and blue wavelength bands, respectively, to said display screen wherein said radiant energy passes through said striped filter means only once.

11. The apparatus of claim 10 wherein said first, second and third areas are rectangular in shape and are arranged in an interleaved pattern.

12. The projection apparatus of claim 11 wherein said striped filter means includes an optically transparent planar substrate.

13. The projection apparatus of claim 12 wherein each of said filter elements comprises a portion of said planar substrate coated with a dielectric layer.

14. The projection apparatus of claim 13 wherein each of said filter elements is rectangular.

15. The projection apparatus of claim 14 wherein said red, green and blue filter elements are interleaved.

16. A projection apparatus for displaying a full-color image on a screen in accordance with red, green and blue video signals comprising:

laser means for providing a beam of coherent light;

means for controlling the intensity of said coherent beam in response to said red, green and blue video signals;

a liquid crystal light valve in optical alignment with said coherent beam for modulating light illuminating an output layer thereof in accordance with an internally generated voltage pattern produced in response to incident of said coherent beam on an input layer thereof;

scanning means for deflecting the coherent beam to a first set of areas on said input layer in response to said red video signal and for deflecting said coherent beam to a second et of areas on said input layer in response to said blue video signal an for deflecting said coherent beam to a third set of areas on said input layer in response to said green video signal;

means for illuminating said output layer with a light source;

polarizing beam splitter means positioned in an optical path between said illuminating light source and said output layer for polarizing and directing said illuminating light onto said output layer and for relaying modulated light reflected by said output layer to an image plane;

optical relay means for focusing said modulated light from said output layer onto said image plane; and striped filter means disposed at said image plane, having red, blue and green filter elements in optical alignment with said first, second and third sets of areas of said input layer for transmitting radiant energy in red, green and blue wavelength bands, respectively, to said display screen wherein said radiant energy passes through said striped filter means only once.

* * * * *

UNITED STATES PATENT AND TRADEMARK OFFICE
CERTIFICATE OF CORRECTION

PATENT NO. : 5,465,174
DATED : November 7, 1995
INVENTOR(S) : Donald E. Sprotbery It is certified that error appears in the above-indentified patent and that said Letters Patent is hereby corrected as shown below:

Title page, item [73], should be --Hughes-JVC Technology Corporation, Carlsbad, California--

Signed and Sealed this

Fifth Day of August, 1997

Attest:

BRUCE LEHMAN

Attesting Officer

Commissioner of Patents and Trademarks